(12) United States Patent
D'Angelo et al.

(10) Patent No.: US 7,536,376 B2
(45) Date of Patent: May 19, 2009

(54) TASK ORIENTED LOG RETRIEVAL UTILIZING A SELF-LEARNING SEARCH TOOL

(75) Inventors: Dario D'Angelo, Los Gatos, CA (US); Mary Anne Morgan, Morgan Hill, CA (US); Trung Q. Nguyen, San Jose, CA (US); Alan R. Smith, Gilroy, CA (US); Thomas R. Sullivan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/678,436

(22) Filed: Oct. 3, 2003

(65) Prior Publication Data

US 2005/0076006 A1   Apr. 7, 2005

(51) Int. Cl.
*G06F 7/00* (2006.01)
*G06F 17/30* (2006.01)

(52) U.S. Cl. ............... 707/2; 707/3; 707/10; 707/100; 707/202; 714/20

(58) Field of Classification Search ............... 707/1–10, 707/100–104.1, 200–205
See application file for complete search history.

(56) References Cited

U.S. PATENT DOCUMENTS

| | | | | |
|---|---|---|---|---|
| 5,355,327 | A |   | 10/1994 | Stent et al. ............. 364/551.01 |
| 5,459,717 | A | * | 10/1995 | Mullan et al. ............... 370/351 |
| 5,560,007 | A | * | 9/1996  | Thai ............................. 707/3 |
| 5,577,241 | A | * | 11/1996 | Spencer ........................ 707/5 |
| 5,581,691 | A | * | 12/1996 | Hsu et al. .................... 714/15 |
| 5,666,528 | A | * | 9/1997  | Thai ........................... 707/102 |
| 5,847,972 | A |   | 12/1998 | Eick et al. ............... 364/514 A |
| 5,907,848 | A | * | 5/1999  | Zaiken et al. ............... 707/202 |
| 5,978,475 | A | * | 11/1999 | Schneier et al. ............. 713/177 |
| 6,009,425 | A | * | 12/1999 | Mohan .......................... 707/8 |
| 6,122,640 | A | * | 9/2000  | Pereira ................... 707/103 R |
| 6,314,425 | B1| * | 11/2001 | Serbinis et al. ............... 707/10 |
| 6,496,833 | B1| * | 12/2002 | Goldberg et al. ............ 707/102 |
| 6,553,509 | B1| * | 4/2003  | Hanson et al. ................. 714/5 |
| 6,567,823 | B1| * | 5/2003  | Rothschild ............... 707/104.1 |
| 6,571,250 | B1| * | 5/2003  | Hara ........................... 707/101 |
| 6,578,026 | B1| * | 6/2003  | Cranston et al. ............... 707/2 |

(Continued)

OTHER PUBLICATIONS

Clayton, et al.; "Relational Key Word Library", IBM Technical Disclosure Bulletin, vol. 32 No. 2, Jul. 1989, p. 431-434.

*Primary Examiner*—Hosain T Alam
*Assistant Examiner*—Usmaan Saeed
(74) *Attorney, Agent, or Firm*—Kunzler & McKenzie

(57) ABSTRACT

A user command communicating at least one log record search key is received from a user. A first set of one or more log records matching the log record search key is retrieved. Utilizing one or more fields from these log records, additional search criteria is dynamically composed. A second set of one or more log records matching the additional search criteria is retrieved from the DBMS log file wherein this second set of log records is logically related to the first set of log records and wherein the second set of log records is void of the log record search key. A log retrieval routine or tool deploying the above method is hereinafter referred to as a "self-learning log retrieval tool".

10 Claims, 9 Drawing Sheets

U.S. PATENT DOCUMENTS

| | | |
|---|---|---|
| 6,772,150 B1 * | 8/2004 | Whitman et al. ............... 707/6 |
| 7,085,782 B2 * | 8/2006 | D'Angelo et al. ........... 707/202 |
| 2002/0007363 A1 * | 1/2002 | Vaitzblit .................... 707/202 |
| 2003/0208560 A1 * | 11/2003 | Inoue et al. ................. 709/219 |
| 2004/0199540 A1 * | 10/2004 | Nojima ....................... 707/102 |

* cited by examiner

TASK ORIENTED LOG RETRIEVAL UTILIZING A SELF-LEARNING SEARCH TOOL

FIELD OF INVENTION

The present invention relates generally to the processing of DBMS (Database Management System) logs, such as IMS (Information Management System) system logs. IMS is a trademark of International Business Machines Corporation in the United States, other countries, or both.

More specifically, the present invention relates to a method to assist system administrators and other support personnel in the retrieval of task related log records.

BACKGROUND

Large enterprises throughout the world rely on mainframe computers running sophisticated Database Management Systems and applications to mange data critical to the survival and growth of their business. One such Database Management System is IMS. IMS is a Hierarchical Database Management System (HDBMS) developed by International Business Machines Corporation. IMS has wide spread usage in many large enterprises where high transaction volume, reliability, availability and scalability are of the utmost importance. IMS, therefore, is particularly relevant to the teachings contained herein wherein analysis pertaining to efficient operation (e.g. problem diagnosis, capacity planning, trend analysis, etc.) is of the utmost importance. Frequently, the system log is an important resource in performing this analysis.

Multiple types of system logs are found within database systems. For example, an IMS system uses the OLDS (Online Log Data Sets) log, and its archival copy SLDS (System Log Data Sets). The OLDS log is the primary receiver of system-generated records that capture important data processing event-related information during IMS processing. Logs, and the information contained therein, are primarily generated and used to maintain IMS system integrity. However, users of IMS have often found many other uses for this information. Typical examples include monitoring, tracing, creating audit trails, debugging, capacity planning and trend analysis. These activities, or tasks, require log records related to the task to be grouped together in order to formulate a "story" describing the various activities.

System utility programs, such as IBM's DFSERA10 utility program, have been traditionally used to access and format log records for the various uses contemplated by the user. However, even though the needed data may be retrieved by this utility, a serious shortcoming exists in that the user must know what records to search for in order to obtain the desired results for the particular task at hand. Furthermore, the user would also need to know how to relate the various records in order to create a meaningful and coherent history. Because the system log records are designed primarily for system use, and not for secondary user tasks, the user is greatly disadvantaged in obtaining and organizing task related data from the system log.

Each log record is identified by a one-byte hex field known as a "type code". A log record may also optionally contain an additional one-byte "subtype code". In order to properly interpret and provide meaning for a given log record, a DSECT (Dummy Section) matching the type code and subtype code for the given record must be utilized. The large number type codes and subtype codes, in combination with large log file sizes and large record sizes, results in an extraordinarily tedious process in attempting to perform most user tasks involving an analysis of log records.

For example, IMS creates and maintains the following types of log records relating to functions within the IMS sub-system:

Data Com/Transaction Mgmt: 01 02 03 11 12 16 31 33 34 35 36 63 72
Full Function Database Processing: 20 21 27 29 4C 50
Fast Path Database Processing: 40 59
System Processing: 01 03 07 08 35 33 36 37 40 56
Queue Management: 01 03 07 08 31 33 34 35 36 27 40
DBRC: 49
Online Reorg: 29

System exits to DFSERA10, such and IBM's DFSERA70 system exit, are available to assist the user in searching for log records matching a particular search element. Typical search arguments, for example, include PST (Partition Specification Table), System ID, Recovery Token, PSB Name and DBD Name. However, even with this added flexibility provided through the DFSERA10 system exit, it is unlikely that a user will know all needed search elements. Furthermore, numerous log records may be related to a particular specified search argument, but not all of these contain the actual search element within the record and accordingly may be missed by the user altogether with information particularly relevant to the task at hand.

Accordingly, there is a great need to provide assistance to system administrators and other support personnel in the retrieval of task related log records whereby all relevant information to the particular task at hand is efficiently returned without requiring detailed internal knowledge of hundreds of different log record types, their information content, and their interrelationships.

SUMMARY OF THE INVENTION

To overcome the limitations in the prior art briefly described above, the present invention provides a method, computer program product, and system to assist system administrators and other support personnel in the retrieval of task related log records from a DBMS log file.

A user command communicating at least one log record search key is received from a user. A first set of one or more log records matching the log record search key is retrieved. Utilizing one or more fields from this first set of log records, additional search criteria is dynamically composed. A second set of one or more log records matching the additional search criteria is retrieved from the DBMS log file wherein this second set of log records is logically related to the first set of log records and wherein the second set of log records is void of the log record search key.

A log retrieval routine or tool deploying the above method is hereinafter referred to as a "self-learning log retrieval tool".

In another embodiment of the present invention, the above-described processing may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for retrieving a set of log records from a DBMS log file is also disclosed. A log retrieval search key is determined. A self-learning log retrieval tool is then invoked wherein the log retrieval search key is made available to the self-learning log retrieval tool. A report generated by the self-learning log retrieval tool is received, wherein the report comprises information from a plurality of log records and wherein at least one of the plurality of log records is void of the log retrieval search key.

In this manner, assistance is provided to system administrators and other support personnel in the retrieval of task related log records. Relevant information to a particular task at hand is efficiently returned from a DBMS log file without requiring detailed internal knowledge of hundreds of different log record types, their information content, and their interrelationships.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the problems associated with the prior art by teaching a system, computer program product, and method to assist system administrators and other support personnel in the retrieval of task related log records from a DBMS log file. Typical user tasks benefiting from the retrieval of log records includes monitoring, tracing, creating audit trails, debugging, capacity planning, trend analysis etc.

These user tasks require log records to be grouped together in order to formulate a "story" relevant to the particular task being performed. However, a serious shortcoming exists with current log record retrieval products in that the user must know what records to search for in order to obtain the desired results. Additionally, the user is required to know how to relate the various records in order to create a meaningful and coherent history. Since the system log records are designed primarily for system use, such as error recovery, the user is greatly disadvantaged in obtaining and organizing information from the log relevant to the task at hand. Current log retrieval applications require the user to be proficient in their knowledge of log record types, log record information content, and log record interrelationships.

The teaching of the present invention provides for an improved way to obtain task related log records. The user is relieved of the burden to acquire detailed knowledge of log records, their content and interrelationships, as the log retrieval facility described herein deploys a self-learning capability wherein search arguments are dynamically added and modified as discoveries are made during actual processing of the log file.

In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
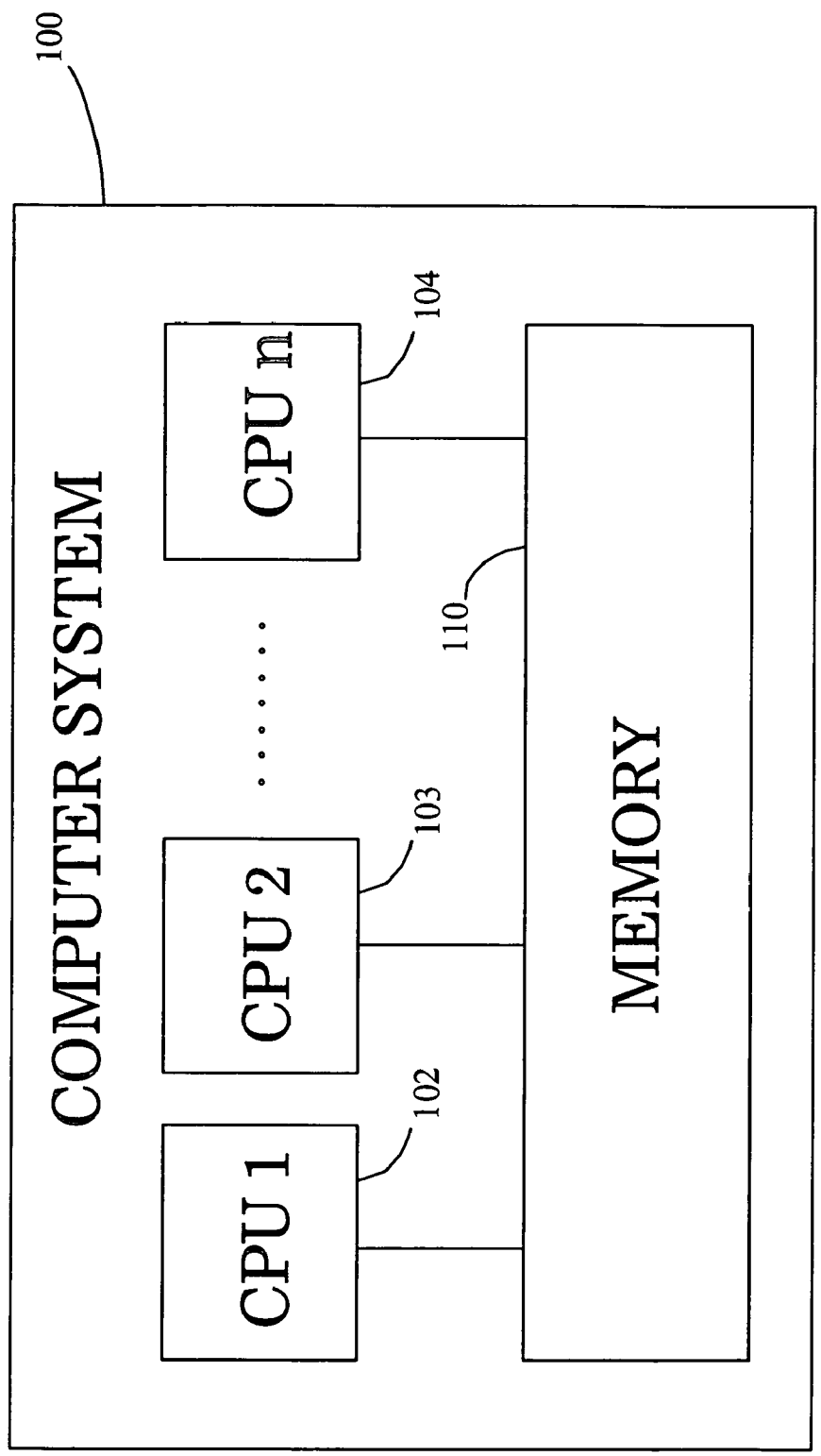
FIG. 1 is a block diagram of a typical computer system wherein the present invention may be practiced.

FIG. 1 is a block diagram of a computer system 100, such as the zSeries mainframe computer system. (zSeries is a trademark of International Business Machines Corporation in the United States, other countries, or both.) The computer system 100 comprises one or more central processing units (CPUs) 102, 103, and 104. The CPUs 102-104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, any other alternative computing environments may be used without departing from the spirit and scope of the present invention.

Figure 2:
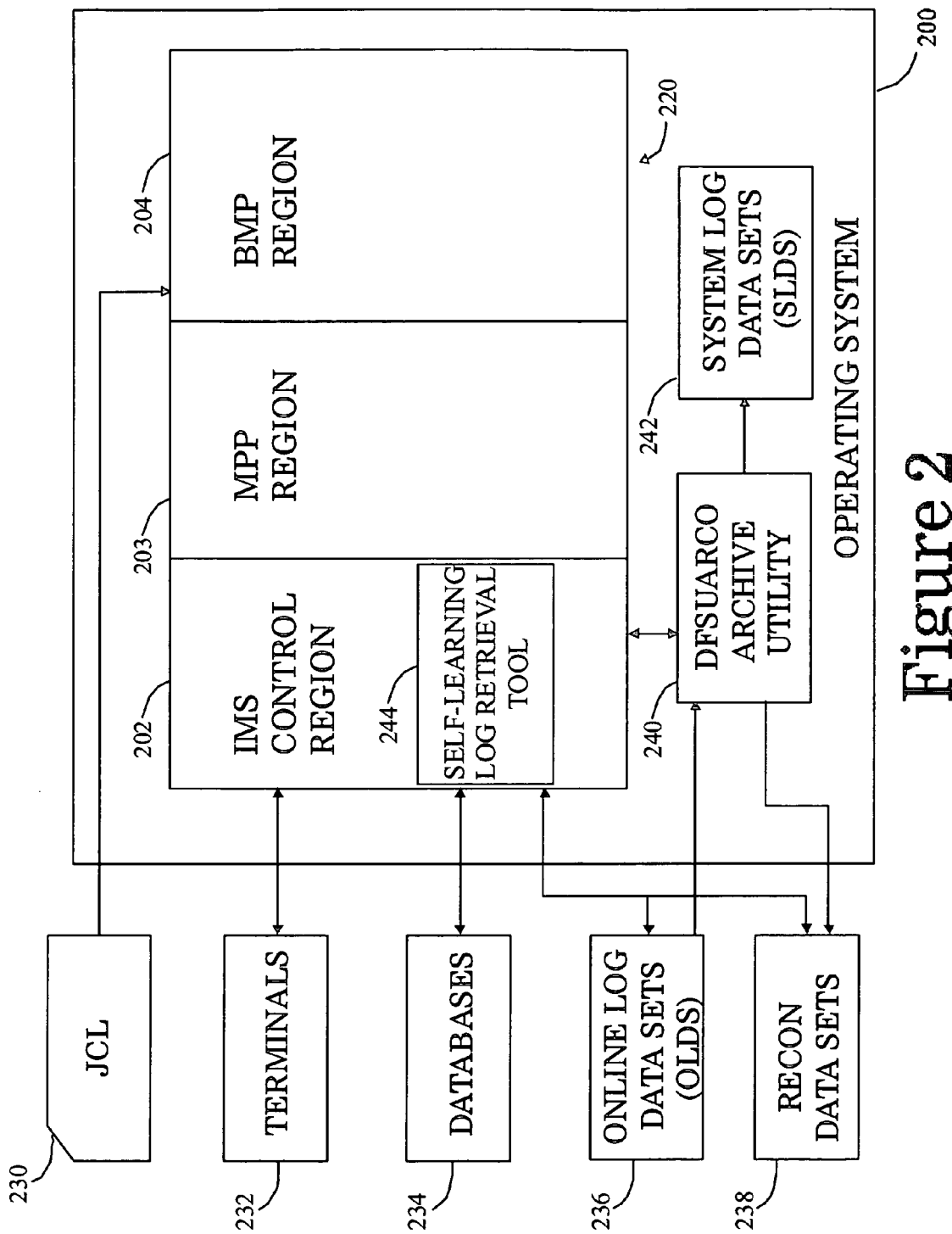
FIG. 2 is a block diagram of an exemplary IMS subsystem.

Referring now to FIG. 2, a block diagram is shown illustrating an exemplary computing environment wherein log data is generated and accumulated for subsequent user analysis. Operating system 200, such as the z/OS operating system, is suitable for managing the resources of computer system 100 and providing the framework for running other computing subsystems and application programs. (z/OS is a trademark of International Business Machines Corporation in the United States, other countries, or both.) Subsystems functionally capable of being provided under the z/OS operating system include the IMS subsystem 220. The IMS subsystem 220 comprises an IMS Control region 202, which manages the region resources comprising Message Processing Program (MPP) region 203 and BMP region 204. Other resources that communicate with, or are managed by, IMS subsystem 220 comprise terminals 232, databases 234, Online Log Data Sets (OLDS) 236, Recon Data Sets 238 and Job Control Language (JCL) 230. Databases 234 may comprise several different types of IMS databases, such as DEDB, HDAM, HIDAM and HISAM.

DFSUARCO archive utility 240, invoked by IMS Control Region 202, receives control from and executes under operating system 200. DFSUARCO archive utility 240 archives a specified Online Log Data Set 236 prior to its reuse by IMS Control Region 202. The archival of Online Log Data Sets result in the creation of System Log Data Sets (SLDS) 242. DFSUARCO updates Recon Data Sets 238 to reflect the existence of each newly archived log.

IMS Control Region 202 invokes Self Learning Log Retrieval Tool 244. In a preferred embodiment, Self Learning Log Retrieval Tool 244 is integrated within IMS Control Region 202. However, those of ordinary skill in the art will recognize that Self Learning Log Retrieval Tool 244 may also be packaged outside of IMS Control Region 202 and operate as a tool or utility program under control of operating system 200 (not shown). Self Learning Log Retrieval Tool 244 is described in detail infra in conjunction with flow diagrams 400, 500, 600, 700, 800 and 900 of FIGS. 4, 5, 6, 7, 8 and 9, respectively.

Those of ordinary skill in the art will recognize that FIG. 2 is exemplary in nature and that many other system configurations are possible within the scope of the present invention. For example, in an alternative IMS configuration other regions, such as an Interactive Fast Path (IFP) region, could also exist.

Generally, the novel methods herein disclosed may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
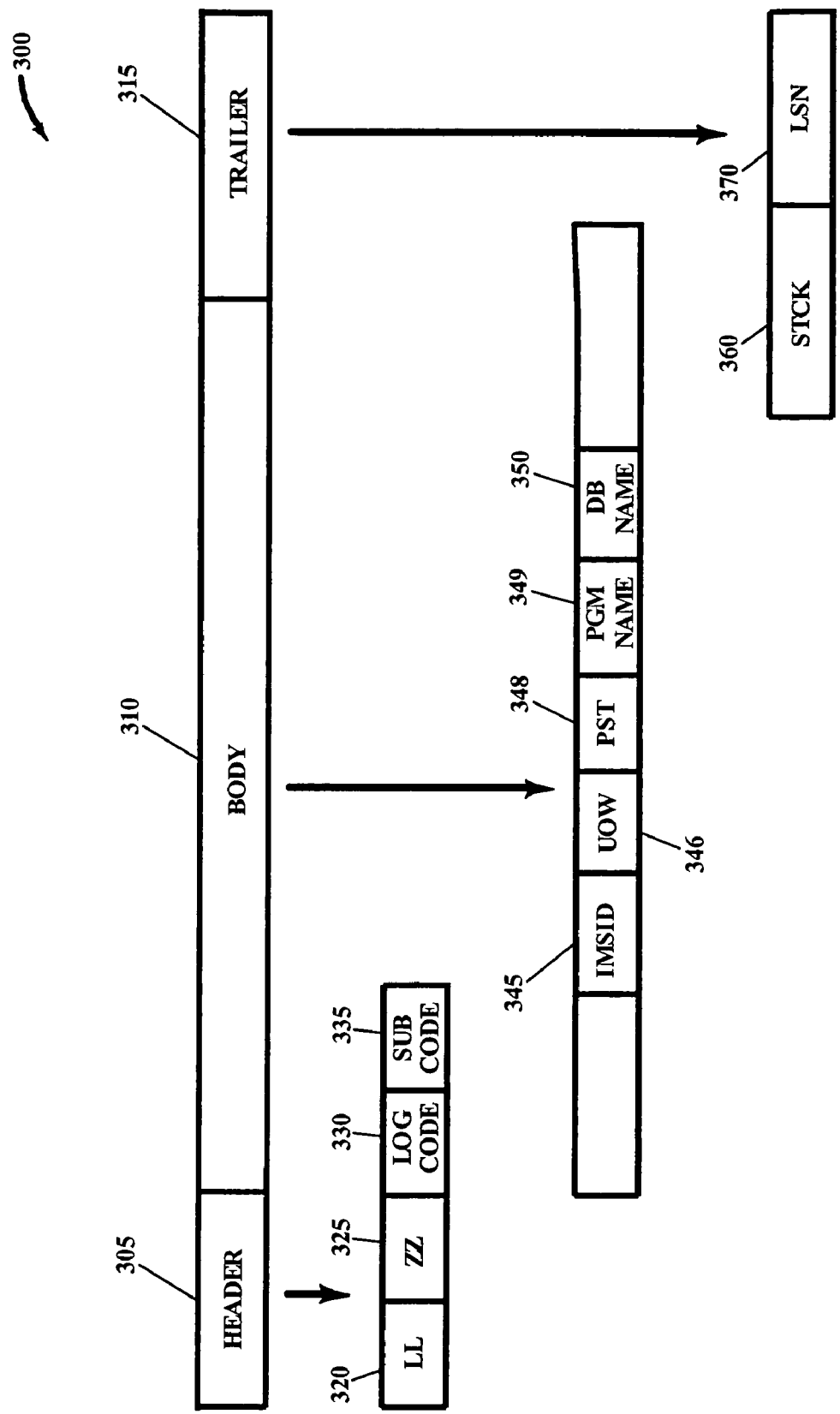
FIG. 3 is a layout of an exemplary log record.

Referring now to FIG. 3, an exemplary log record 300 is shown as generated by the exemplary system illustrated in FIG. 2. Log record 300 comprises header 305, body 310 and trailer 315. Header 305 comprises a two byte length field 320, a two byte reserved field 325, a one byte log type code 330 and, optionally, a one byte log subtype code 335. Body 310 of log record 300 comprises a variety of fields, the particular fields dependent upon the log type code and log subtype code. An exemplary set of fields commonly included within a majority of log records include IMSID 345, UOW (Unit of Work) 346, PST (Partition Specification Table) 348, PGM-NAME (Program Name) 349 and DBNAME (Database Name) 350. Numerous other searchable fields may exist within body 310, the exact composition of which is dependent upon the type of log record and the information required to be retained in accordance with its purpose.

Trailer component 315 comprises a Store Clock Value (STCK) 360 and a Logical Sequence Number (LSN) 370. Reference to log record 300 and the various fields described in FIG. 3 are referenced from time to time as details of the present invention are further disclosed. Numerous other fields, mandatory or optional, may be present with log record 300. Fields not specially shown in FIG. 3 are not required to fully comprehend the present invention.

Figure 4:
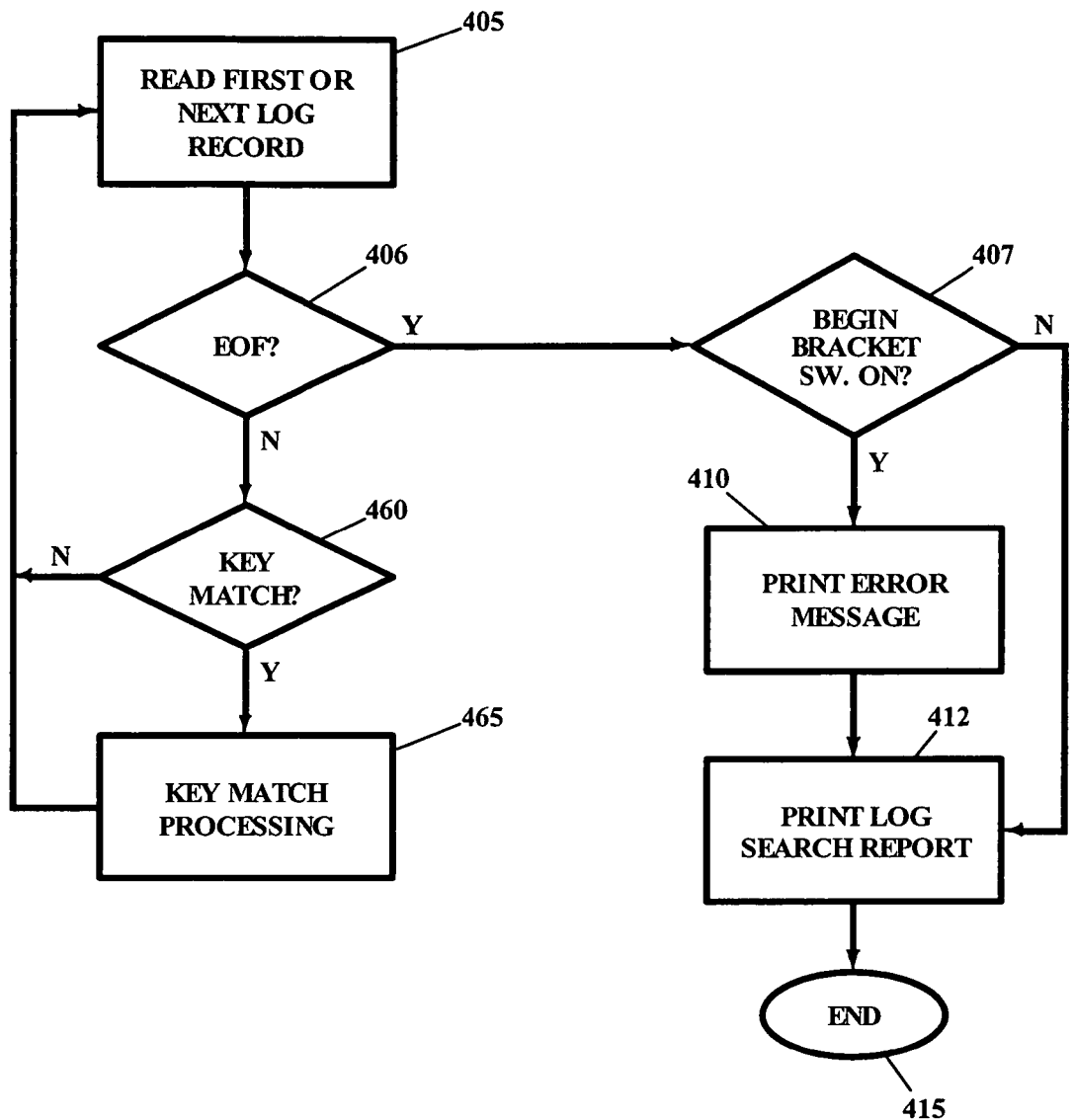
FIG. 4 is a flow diagram summarizing the high level logic of an exemplary self-learning log retrieval tool.

Referring now to FIG. 4, flow diagram 400 summarizes one embodiment of a self-learning log retrieval tool in accordance with the present invention. In step 405, the first or next record from a log file is read and then, in step 406, a test is made to determine if an EOF (End-of-File) condition has been reached. This condition occurs when there are no more records in the log file to read, or when an EOF condition has been forced, as further described infra in conjunction with flow diagram 500 of FIG. 5. If an EOF condition has been reached, control passes to step 407 where a test is made to determine if the Begin Bracket switch is set to ON.

A Begin Bracket is a log record which occurs as the first record logically related to an event; and the "Begin Bracket switch" is an internal indicator that such a record for a given search key has been encountered, or that the error processing associated with a missing Begin Bracket has already been performed. An End Bracket is a log record which occurs as the last record logically related to an event.

If the Begin Bracket switch is not set to ON, then control passes to step 412 where the Log Search Report is printed. Otherwise, an error message is printed in step 410 prior to proceeding to step 412, discussed supra. Following step 412, processing completes at step 415 where control returns to operating system 200.

The term "printing", as used within the context of this specification means to communicate information to the user. Those of ordinary skill in the art will recognize that this communication may occur in a variety of ways within a computing system. Typical examples, not intended to be exhaustive, include sending codes or text to a display, retaining user communication information in memory or recordable media, sending information over a network, printing information on a printing device, or incorporating information into a log search report.

Returning now to step 406, if an EOF condition has not been reached, control passes to step 460 to determine if there is a key match between a search key and the currently read log record. If there is no key match, processing returns to step 405, discussed supra. Otherwise, in step 465, key match processing is performed prior to returning to step 405.

Figure 5:
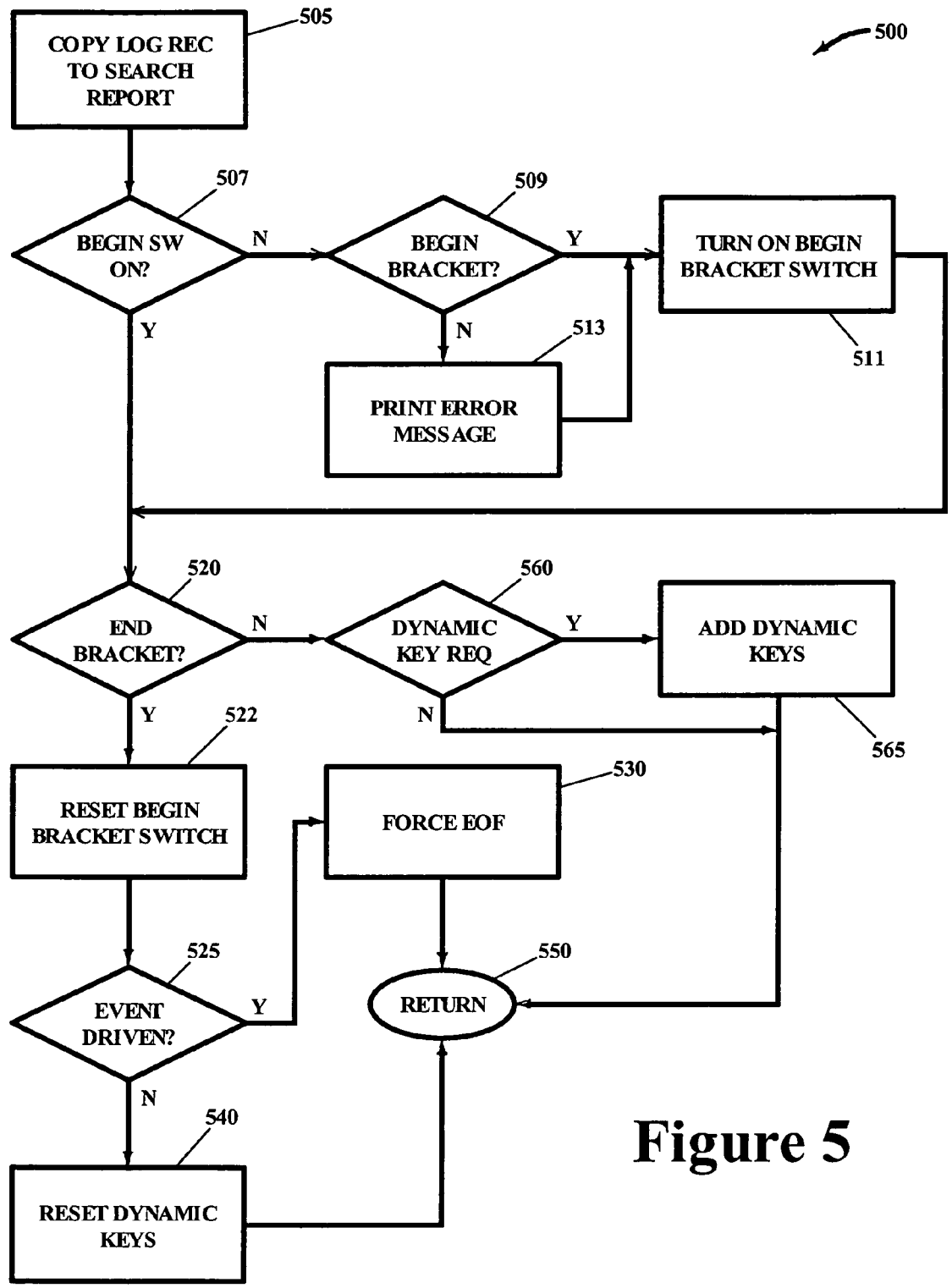
FIG. 5 is a flow diagram summarizing one embodiment of a routine for performing key match processing.

Referring now to FIG. 5, flow diagram 500 provides additional detail for step 465 of flow diagram 400, discussed supra. In step 505, data from the currently read log record from step 405 of flow diagram 400 is included in a log search report. In step 507, a test is made to determine if the Begin Bracket switch is set to ON. If the Begin Bracket switch is OFF, control passes to step 509 where a further test is made to determine if the current record is a Begin Bracket record. If so, the Begin Bracket switch is set to ON in step 511 prior to proceeding to step 520. Otherwise, an error message is printed and then processing resumes at step 511, discussed supra.

Returning now to step 507, if the Begin Bracket switch is ON, then control passes to step 520 where a test is made to determine if the current record is an End Bracket. If so, the Begin Bracket switch is set to OFF in step 522. Proceeding to step 525, a test is made to determine if the user specified key is an event driven key. Those of ordinary skill in the art will recognize that an event driven key is associated with a unique event within the log file and all log records matching the key must be related. An example of an event driven key is a UOW (Unit of Work). If the key is event driven, and since the End Bracket signifies the conclusion of the related log record stream, an EOF condition is forced in step 530 prior to returning at step 550.

Returning now to step 525, if the key is not an event driven key, then processing continues with step 540 wherein dynamic key reset is performed. This processing is described in greater detail infra in conjunction with flow diagram 900 of FIG. 9. Following dynamic key reset, processing continues to step 550, where processing completes normally and control is returned to step 405 of flow diagram 400.

Returning now to step 520, if the current log record is not an End Bracket, processing continues with step 560 where a test is made to determine if the user has requested the dynamic search key enhancement. If so, in step 565, search keys are dynamically added to the search criteria and then, in step 550, processing completes normally and control is returned to step 405 of flow diagram 400. Step 565 is explained in greater detail infra in conjunction with flow diagram 600 of FIG. 6. If dynamic search key enhancement was not selected from the test in step 560, processing completes normally at step 550 as described supra.

Figure 6:
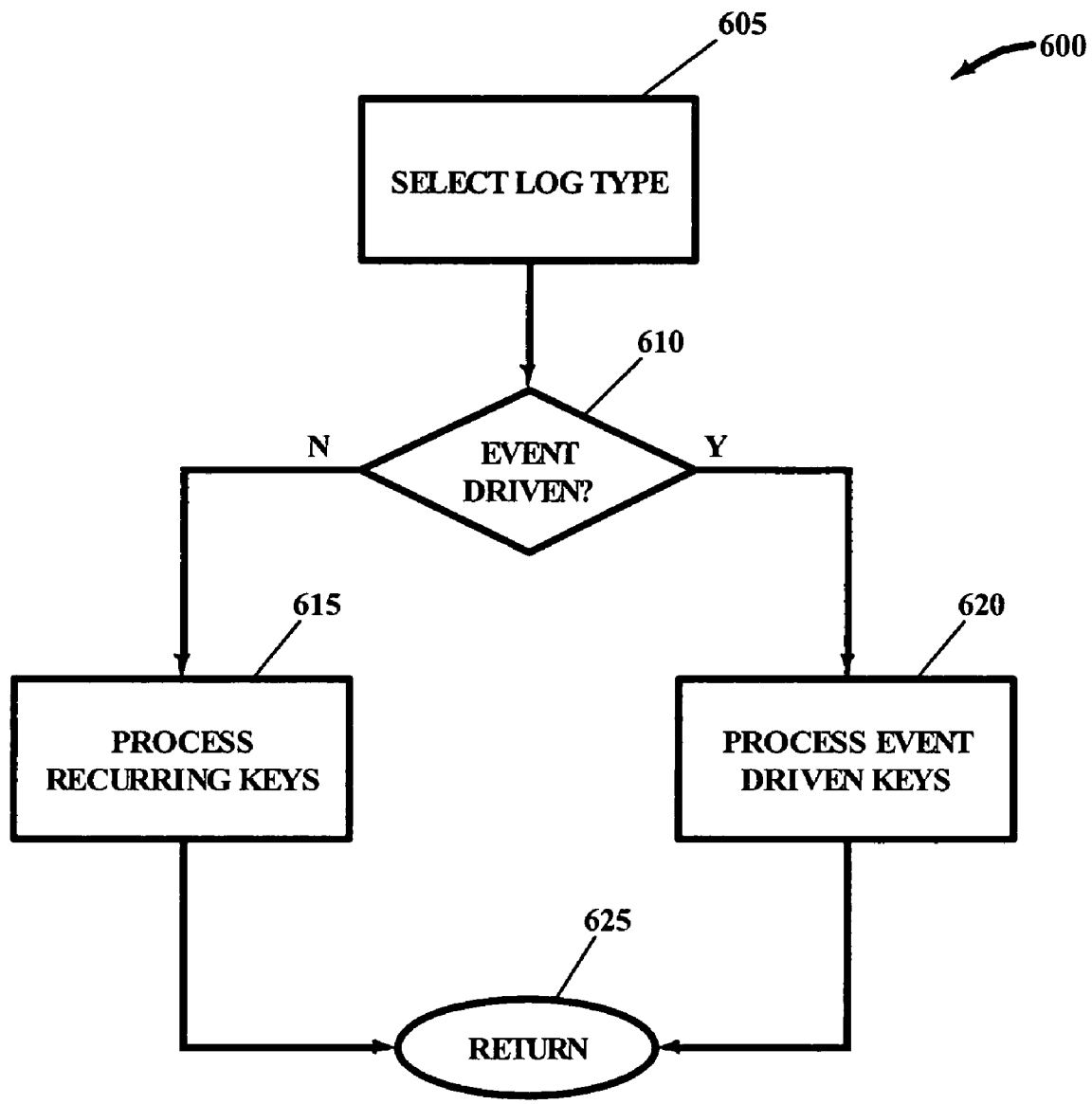
FIG. 6 is a flow diagram summarizing one embodiment of a high level routine for performing dynamic key adds.

Referring now to FIG. 6, flow diagram 600 provides additional processing detail for step 565 of flow diagram 500, discussed supra, where keys are dynamically added to the search criteria, thereby facilitating the self-learning capability of the log retrieval tool. In step 605, the log type is determined from the currently retrieved log record. Then, in step 610, a test is made to determine if the user supplied key is an event driven key. If so, in step 620, the event driven key is processed, as will be further explained infra in conjunction with flow diagram 700 of FIG. 7. If not, the key is a recurring key and, accordingly, in step 615 the recurring key is processed. This processing is further explained in flow diagram 800 of FIG. 8. Following either step 615 or step 620, control passes to step 625 where processing completes normally and control returns to step 550 of flow diagram 500, discussed supra.

Figure 7:
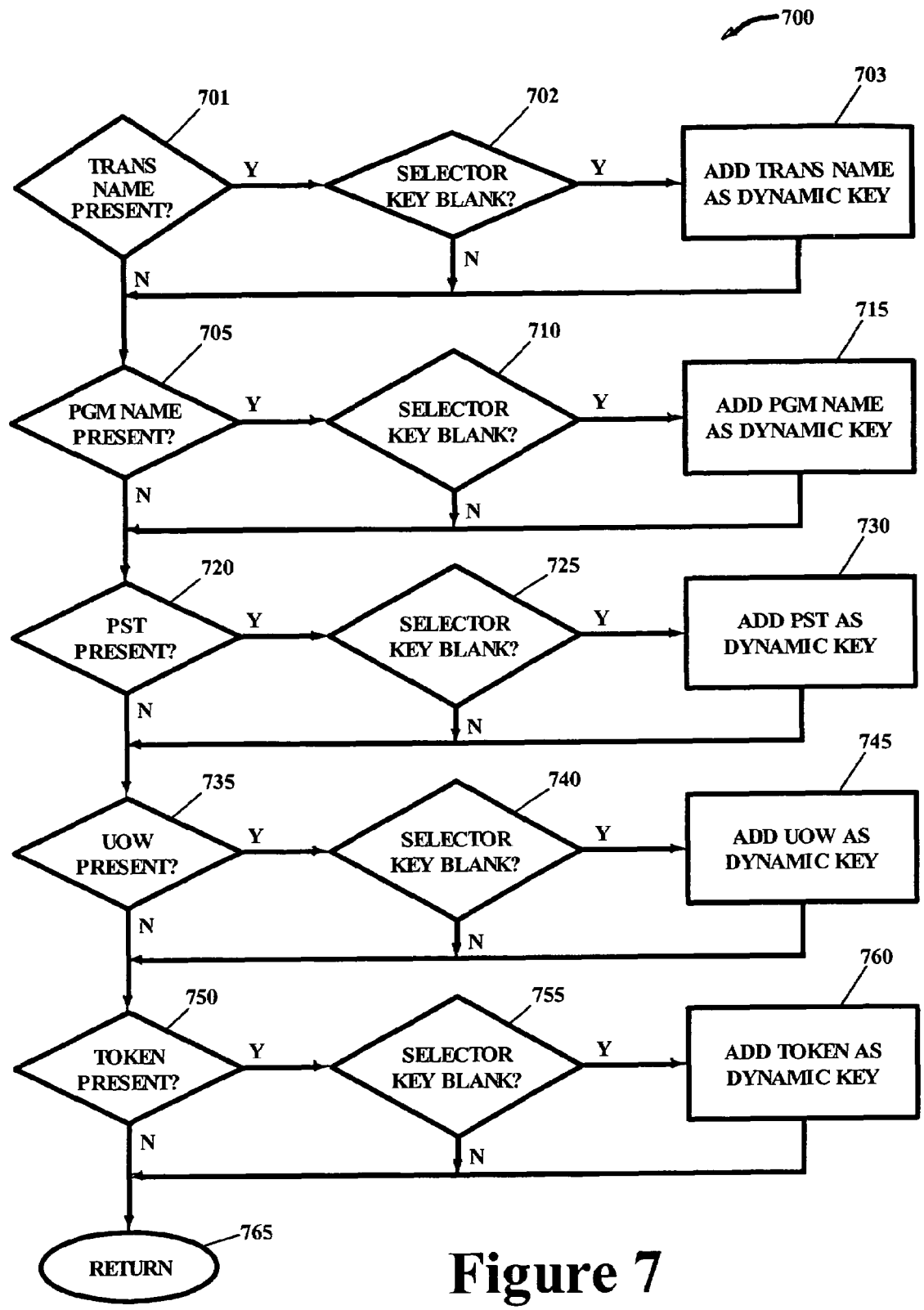
FIG. 7 is a flow diagram providing additional processing detail for dynamic key adds when the key is event related.

Referring now to flow FIG. 7, flow diagram 700 provides additional processing detail for step 620 of flow diagram 600, discussed supra, wherein event driven keys are handled. In step 701, a test is made to determine if a transaction name exists within the currently read log record. If so, in step 702, a test is made to determine if the transaction selector key is blank. If so, in step 703, the transaction name from the currently read log record is added as a dynamic key to the current search criteria prior to continuing with step 705. Otherwise, step 703 is bypassed, and processing proceeds to step 705.

Returning now to step 701, if a transaction name does not exist in the currently read log record, then processing proceeds directly to step 705. In step 705, a test is made to determine if a program name exists within the currently read log record. If so, in step 710, a further test is made to determine if the program name selector key is blank. If so, in step 715, the program name from the currently read log record is added as a dynamic key to the current search criteria prior to continuing with step 720. Otherwise, step 715 is bypassed and processing proceeds to step 720.

Returning now to step 705, if a program name does not exist in the currently read log record, then processing proceeds directly to step 720. Here, a test is made to determine if a Partition Specification Table (PST) is present in the currently read log record. If so, in step 725, a further test is made to determine if the PST selector key is blank. If so, in step 730, the PST from the currently read log record is added as a dynamic key to the current search criteria prior to continuing with step 735. Otherwise, step 730 is bypassed and processing proceeds to step 735.

Returning now to step 720, if a PST does not exist in the currently read log record, then processing proceeds directly to step 735. Here a test is made to determine if a Unit of Work (UOW) is present in the currently read log record. If so, in step 740, a further test is made to determine if the UOW selector key is blank. If so, in step 745, the UOW from the currently read log record is added as a dynamic key to the current search criteria prior to continuing with step 750. Otherwise, step 745 is bypassed and processing proceeds to step 750.

Returning now to step 735, if a UOW does not exist in the currently read log record, the processing proceeds directly to step 750. Here a test is made to determine if a token is present in the currently read log record. If so, in step 755, a further test is made to determine if the token selector key is blank. If so, in step 760, the token from the currently read log record is added as a dynamic key to the current search criteria prior to continuing with step 765. Otherwise, step 760 is bypassed and processing proceeds to step 765.

Returning now to step 750, if a token does not exist in the currently read log record, the processing proceeds directly to step 765, where processing completes normally and control is returned to step 625 of flow diagram 600.

Figure 8:
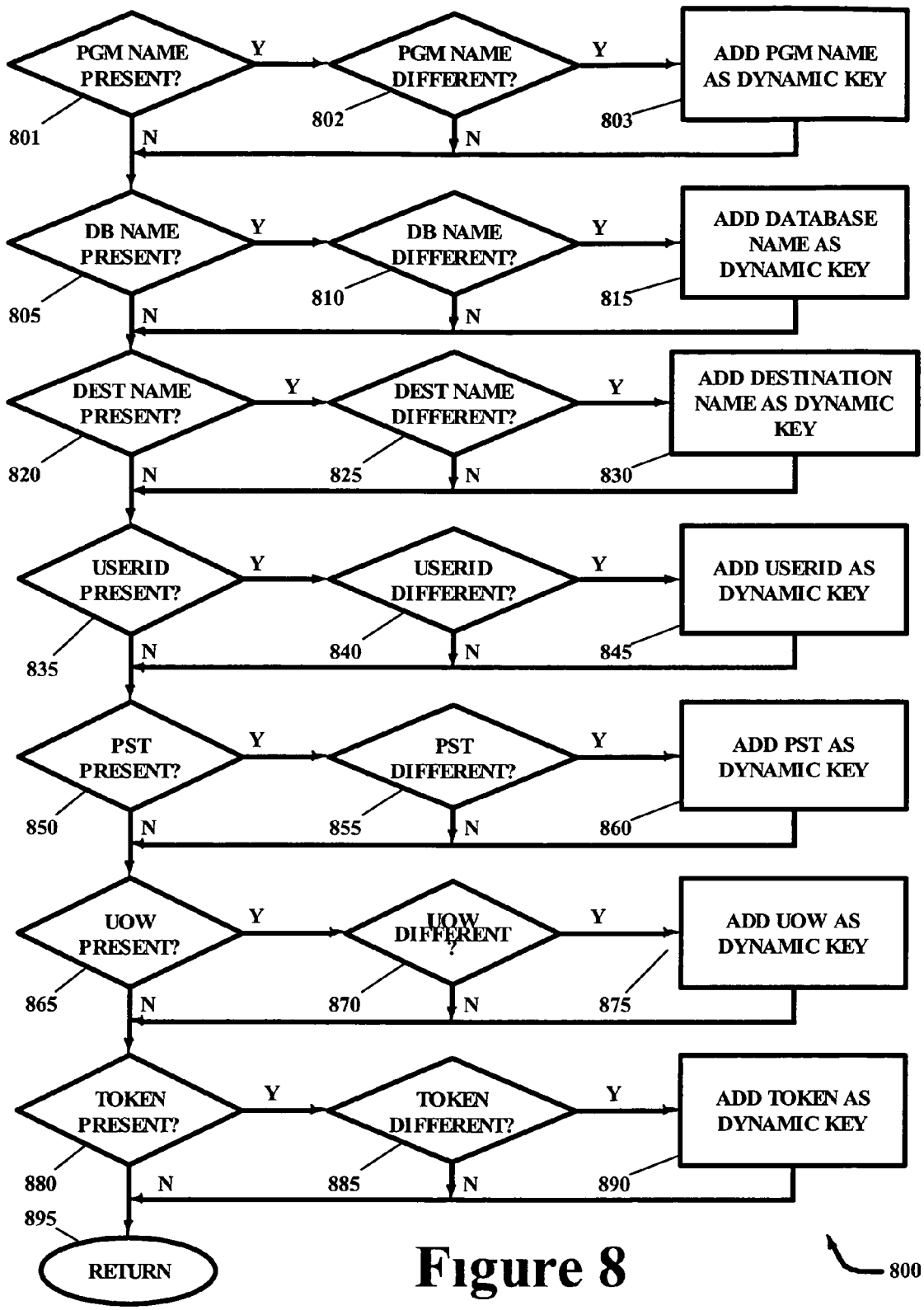
FIG. 8 is a flow diagram providing additional processing detail for dynamic key adds when the key is recurring.

Referring now to FIG. 8, flow diagram 800 provides additional processing detail for step 615 of flow diagram 600, discussed supra, wherein recurring keys are handled. In step 801, a test is made to determine if a program name exists within the currently read log record. If so, in step 802, a further test is made to determine if the program name is different from all currently specified program name selector keys. If so, in step 803, the program name from the currently read log record is added as a dynamic key to the current search criteria prior to continuing with step 805. Otherwise, step 803 is bypassed and processing proceeds to step 805.

Returning now to step 801, if a program name does not exist in the currently read log record, then processing proceeds directly to step 805. In step 805, a test is made to determine if a database name exists within the currently read log record. If so, in step 810, a further test is made to determine if the database name is different from all currently specified database name selector keys. If so, in step 815, the database name from the currently read log record is added as a dynamic key to the current search criteria prior to continuing with step 820. Otherwise, step 815 is bypassed and processing proceeds to step 820.

Returning now to step 805, if a database name does not exist in the currently read log record, then processing proceeds directly to step 820. In step 820, a test is made to determine if a destination name exists within the currently read log record. A destination name is defined as a-transaction name or a logical terminal (LTERM) name. If so, in step 825, a further test is made to determine if the destination name is different from all currently specified destination name selector keys. If so, in step 830, the destination name from the currently read log record is added as a dynamic key to the current search criteria prior to continuing with step 835. Otherwise, step 830 is bypassed and processing proceeds to step 835.

Returning now to step 820, if a destination name does not exist in the currently read log record, then processing proceeds directly to step 835. In step 835, a test is made to determine if a USERID exists within the currently read log record. If so, in step 840, a further test is made to determine if the USERID is different from all currently specified USERID selector keys. If so, in step 845, the USERID from the currently read log record is added as a dynamic key to the current search criteria prior to continuing with step 850. Otherwise, step 845 is bypassed and processing proceeds to step 850.

Returning now to step 835, if a USERID does not exist in the currently read log record, then processing proceeds directly to step 850. Here a test is made to determine if a PST exists within the currently read log record. If so, in step 855, a further test is made to determine if the PST is different from all currently specified PST selector keys. If so, in step 860, the PST from the currently read log record is added as a dynamic key to the current search criteria prior to continuing with step 865. Otherwise, step 860 is bypassed and processing proceeds to step 865.

Returning now to step 850, if a PST does not exist in the currently read log record, then processing proceeds directly to step 865. In step 865, a test is made to determine if a UOW exists within the currently read log record. If so, in step 870, a further test is made to determine if the UOW is different from all currently specified UOW selector keys. If so, in step 875, the UOW from the currently read log record is added as a dynamic key to the current search criteria prior to continuing with step 880. Otherwise, step 875 is bypassed and processing proceeds to step 880.

Returning now to step 865, if a UOW does not exist in the currently read log record, then processing proceeds directly to step 880. In step 880, a test is made to determine if a token exists within the currently read log record. If so, in step 885, a further test is made to determine if the token is different from all currently specified token selector keys. If so, in step 890, the token from the currently read log record is added as a dynamic key to the current search criteria prior to continuing with step 895. Otherwise, step 890 is bypassed and processing proceeds to step 895.

Returning now to step 880, if a token does not exist in the currently read log record, then processing proceeds directly to step 895. In step 895, processing terminates normally and control is returned to step 625 of flow diagram 600.

Figure 9:
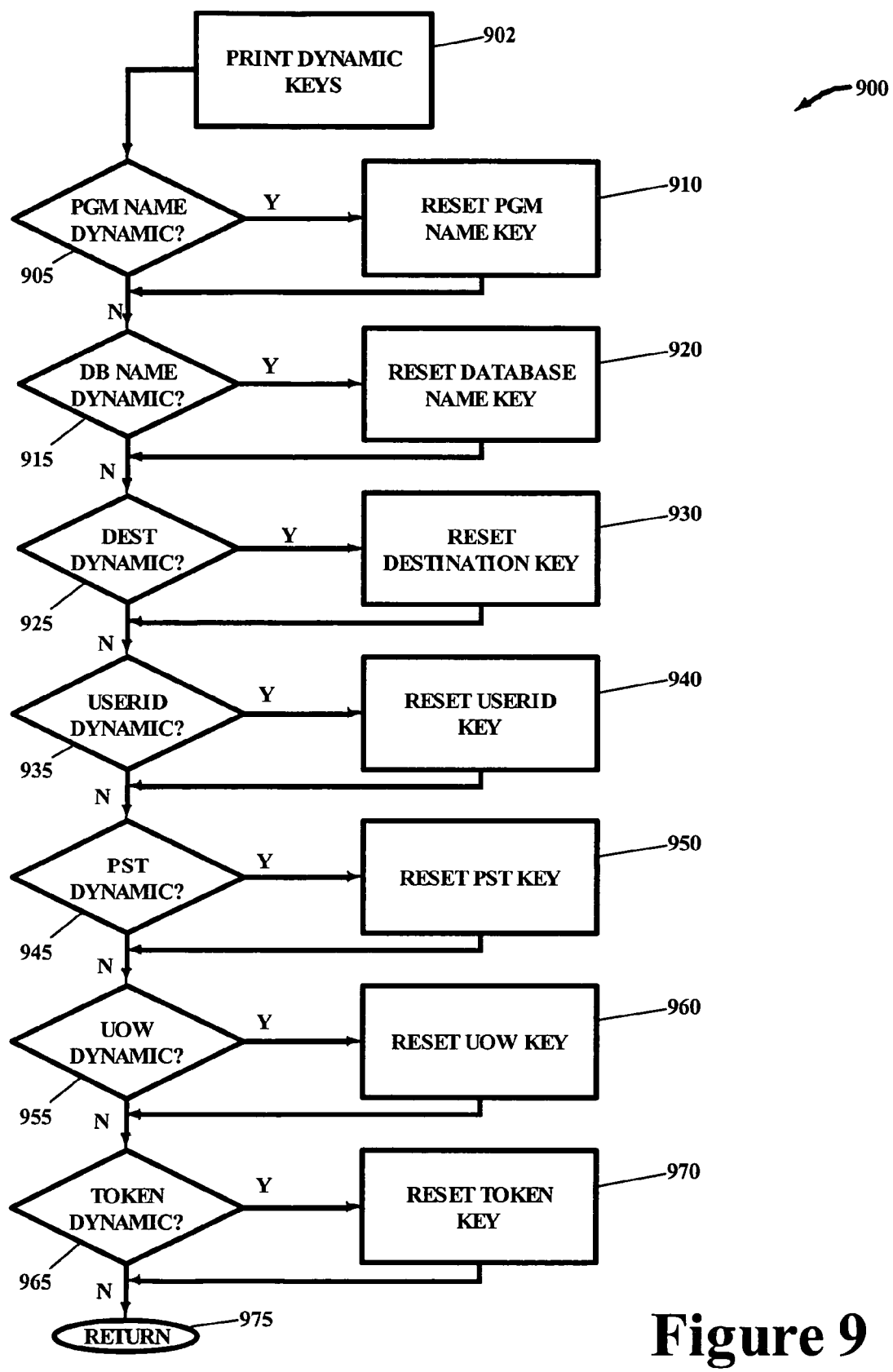
FIG. 9 is a flow diagram summarizing dynamic key reset.

Referring now to FIG. 9, flow diagram 900 provides additional processing detail for step 540 of flow diagram 500, discussed supra, wherein dynamic keys are reset. In step 902 all dynamically acquired search keys are printed so that the user will have a comprehensive list of all dynamically acquired keys utilized during the log search and retrieval processing. Those of ordinary skill in the art will recognize that "printing" is intended to mean communicating this information to the user, and further recognize that this may be accomplished in a variety of ways. In the preferred embodiment, this information is included within the log search report.

Continuing with step 905, a test is made to determine if a program name key was dynamically acquired. If so, in step 910, the program name key is reset wherein it is no longer utilized within the self-learning log tool's search criteria; otherwise, control passes to step 915. In step 915, a test is made to determine if a database name key was dynamically acquired. If so, in step 920, the database name key is reset; otherwise, control passes to step 925.

Continuing with step 925, a test is made to determine if a destination key was dynamically acquired. If so, in step 930, the destination key is reset wherein it is no longer utilized within the self-learning log tool's search criteria; otherwise, control passes to step 935. In step 935, a test is made to determine if a USERID key was dynamically acquired. If so, in step 940, the USERID key is reset; otherwise, control passes to step 945.

Continuing with step 945, a test is made to determine if a PST key was dynamically acquired. If so, in step 950, the PST key is reset wherein it is no longer utilized within the self-learning log tool's search criteria; otherwise, control passes to step 955. In step 955, a test is made to determine if a UOW key was dynamically acquired. If so, in step 960, the UOW key is reset; otherwise, control passes to step 965.

Continuing with step 965, a test is made to determine if a token key was dynamically acquired. If so, in step 970, the token key is reset wherein it is no longer utilized within the self-learning log tool's search criteria; otherwise, control passes to step 975. In step 975, processing completes normally and control is returned to step 550 of flow diagram 500, FIG. 5.

Taken in combination, flow diagrams 400, 500, 600, 700, 800 and 900 in conjunction with supporting diagrams and detailed descriptions, provide for improved productivity and enhanced reliability for system administrators and other support personal utilizing information within DBMS system logs in the performance of various tasks, such as capacity planning, trend analysis, tracing, audit trails, security analysis, debugging etc. Utilizing the teachings contained herein, task related log records may be retrieved without requiring a user to know detailed information about log record content, log record types, and their complex interrelationships.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A computer implemented method for retrieving log data from an IMS (Information Management System) log file comprising:
   receiving from a user a command issued by a computing device comprising a processor and a memory, wherein said command communicates at least one IMS log record search key;
   retrieving from an IMS log file a first set of one or more IMS log records matching said IMS log record search key, each IMS log record comprising a one-byte hex field that identifies a log record type associated with each log record, each log record type associated with a particular set of searchable log record fields;
   utilizing one or more log record fields from said first retrieved set of one or more IMS log records to dynamically compose additional search criteria, said additional search criteria comprising at least one additional IMS log record search key not included in the original communicated at least one IMS log record search key;
   retrieving from said IMS log file a second set of one or more IMS log records matching said additional search criteria, wherein said second set of IMS log records is logically related to said first set of IMS log records and wherein said second set of IMS log records does not include members of said first set of IMS log records; and
   presenting said first set of IMS log records and said second set of IMS log records.

2. The method of claim 1 further comprising generating a report wherein said report comprises information from said first set of log records and said second set of log records.

3. The method of claim 1 further comprising resetting said dynamically composed additional search criteria if an End Bracket log record is retrieved and if said log record search key comprises a recurring key.

4. The method of claim 1 wherein said IMS (Information Management System) log file is an IMS OLDS (Online Log Data Set) log file.

5. The method of claim 4 further comprising printing a message when a retrieved log record is not encompassed by a retrieved Begin Bracket log record and a retrieved End Bracket log record.

6. The method of claim 1 further comprising the termination of all subsequent log record retrievals if an End Bracket log record is retrieved and if said log record search key comprises an event key.

7. The method of claim 1 wherein said additional search criteria comprises a database name key.

8. The method of claim 1 further comprising utilizing one or more fields from said second set of log records to dynamically further modify said additional search criteria wherein a third set of one or more log records is retrieved utilizing said modified additional search criteria.

9. A computer implemented method for retrieving information from a set of log records residing within an IMS (Information Management System) log file, comprising:

determining an IMS log retrieval search key;

invoking a self-learning log retrieval tool operated by a computing device comprising a processor and a memory, wherein said IMS log retrieval search key is made available to said self-learning log retrieval tool, the self-learning retrieval tool configured to retrieve from an IMS log file a first set of one or more IMS log records matching said IMS log record search key, each IMS log record comprising a one-byte hex field that identifies a log record type associated with each log record, each log record type associated with a particular set of searchable log record fields;

utilize one or more log record fields from said first retrieved set of one or more IMS log records to dynamically compose additional search criteria, said additional search criteria comprising at least one additional IMS log record search key not included in the original communicated at least one IMS log record search key; and receiving a report generated by said self-learning log retrieval tool wherein said report comprises information from a plurality of IMS log records and wherein at least one of said plurality of IMS log records does not include said IMS log retrieval search key.

10. A computer implemented method for retrieving log data from an IMS (Information Management System) log file comprising:

receiving from a user a command issued by a computing device comprising a processor and a memory, wherein said command communicates at least one IMS log record search key;

retrieving from an IMS log file a first set of one or more IMS log records matching said IMS log record search key, each IMS log record comprising a one-byte hex field for identifying a log record type associated with each log record, each log record type associated with a particular set of searchable log record fields;

identifying a log record type of a first IMS log record from said first retrieved set of one or more IMS log records;

determining whether the original communicated IMS log record search key is an event driven key or a recurring key;

processing one or more fields from the first IMS log record according to the identified log record type and according to the determination that the original communicated IMS log record search key is an event driven key or a recurring key;

dynamically generating additional search criteria comprising one or more IMS log record search keys based the one or more processed fields of the first IMS log record;

retrieving from said IMS log file a second set of one or more IMS log records matching said additional search criteria, wherein said second set of IMS log records is logically related to said first set of IMS log records and wherein said second set of IMS log records does not include members of said first set of IMS log records; and presenting the first set of IMS log records and the second set of IMS log records.

\* \* \* \* \*